United States Patent
Ashjaee

(10) Patent No.: US 6,659,409 B2
(45) Date of Patent: Dec. 9, 2003

(54) POSITIONING POLES FOR SURVEYING EQUIPMENT, GLOBAL POSITIONING ANTENNAS, AND THE LIKE

(75) Inventor: Javad Ashjaee, Saratoga, CA (US)

(73) Assignee: Topson GPS LLC, Pleasanton, CA (US)

( * ) Notice: Subject to any disclaimer, the term of this patent is extended or adjusted under 35 U.S.C. 154(b) by 0 days.

(21) Appl. No.: 10/104,871

(22) Filed: Mar. 21, 2002

(65) Prior Publication Data

US 2003/0178537 A1 Sep. 25, 2003

(51) Int. Cl.[7] ................................................. F16M 11/38
(52) U.S. Cl. ........................................ 248/170; 248/435
(58) Field of Search ................................. 248/170, 169, 248/188.6, 187.1, 435, 434, 432, 171, 168, 177.1, 188, 188.7, 188.8, 218.4, 224.51, 166

(56) References Cited

U.S. PATENT DOCUMENTS

| 294,290 | A | * | 2/1884 | Muller | 248/435 |
|---|---|---|---|---|---|
| 637,622 | A | * | 11/1899 | Krick | 248/170 |
| 1,894,695 | A | * | 1/1933 | Ley | 248/171 |
| 2,794,612 | A | * | 6/1957 | Clipton | 108/141 |
| 4,215,839 | A | * | 8/1980 | Gibran | 248/170 |
| 5,222,705 | A | * | 6/1993 | Gibran et al. | 248/170 |
| 5,458,305 | A | * | 10/1995 | Woodward | 248/121 |
| 6,454,228 | B1 | * | 9/2002 | Bosnakovic | 248/177.1 |

* cited by examiner

*Primary Examiner*—Anita King
*Assistant Examiner*—Tan Le
(74) *Attorney, Agent, or Firm*—Sheppard Mullin Richter & Hampton LLP

(57) ABSTRACT

A positioning pole comprising an elongated center pole, a first guide disposed on an outer surface of the center pole, a first support leg, and a first attachment coupler which pivotally attaches the first support leg to the first guide. The first guide has an elongated dimension oriented parallel to the elongated dimension of the pole. The first attachment coupler has an elongated dimension oriented parallel to the elongated dimension of the guide, a first face, and a second face. The first face of the first attachment coupler has a contoured surface interfitting with the pole's first guide and enables the first attachment coupler to slide along the elongated dimension of the first guide without separating from the guide in directions that are perpendicular to the guide's elongated dimension. A locking mechanism locks the attachment coupler to a corresponding guide once a desired position is found for the support leg.

27 Claims, 4 Drawing Sheets

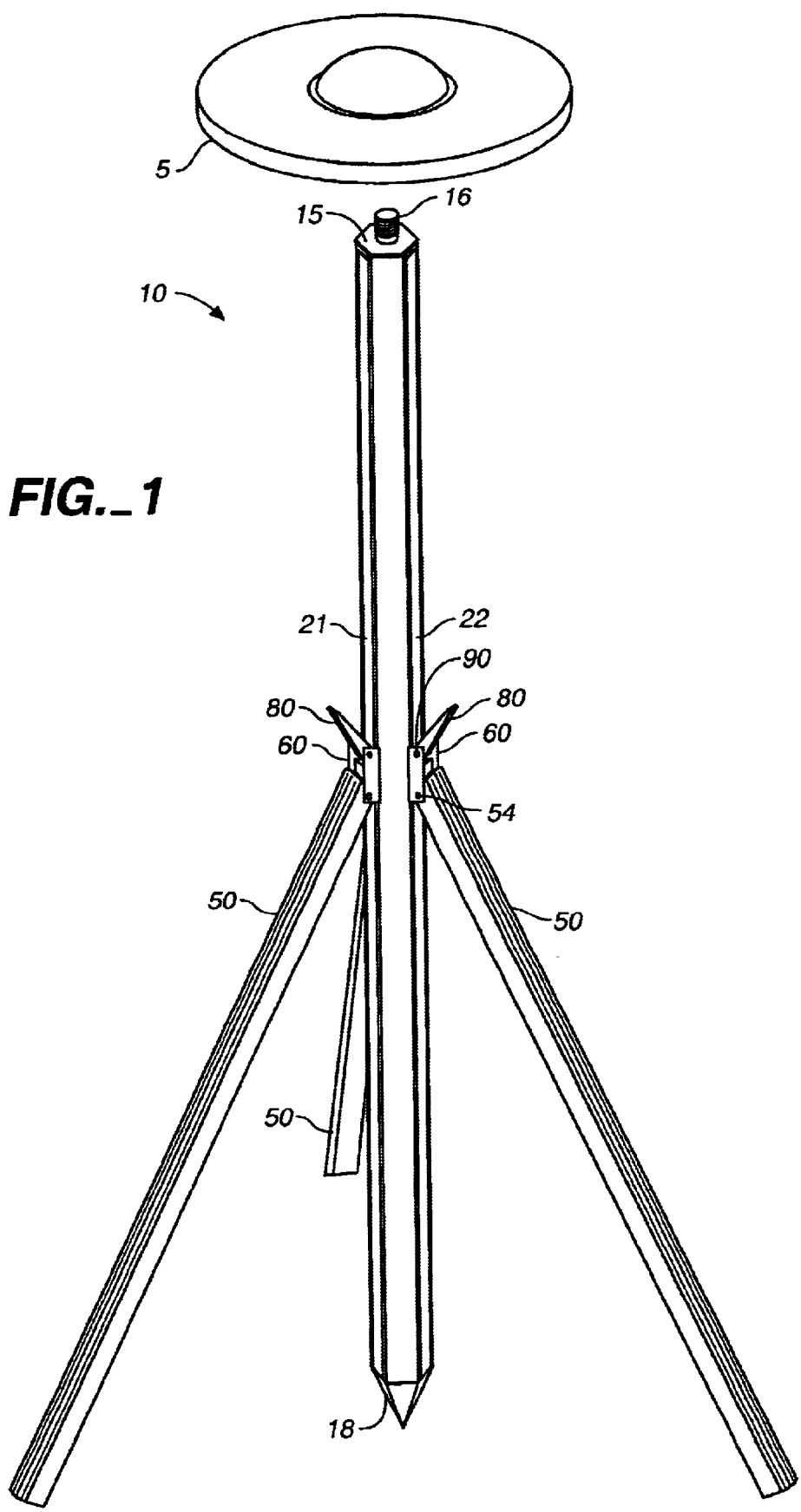
FIG._1

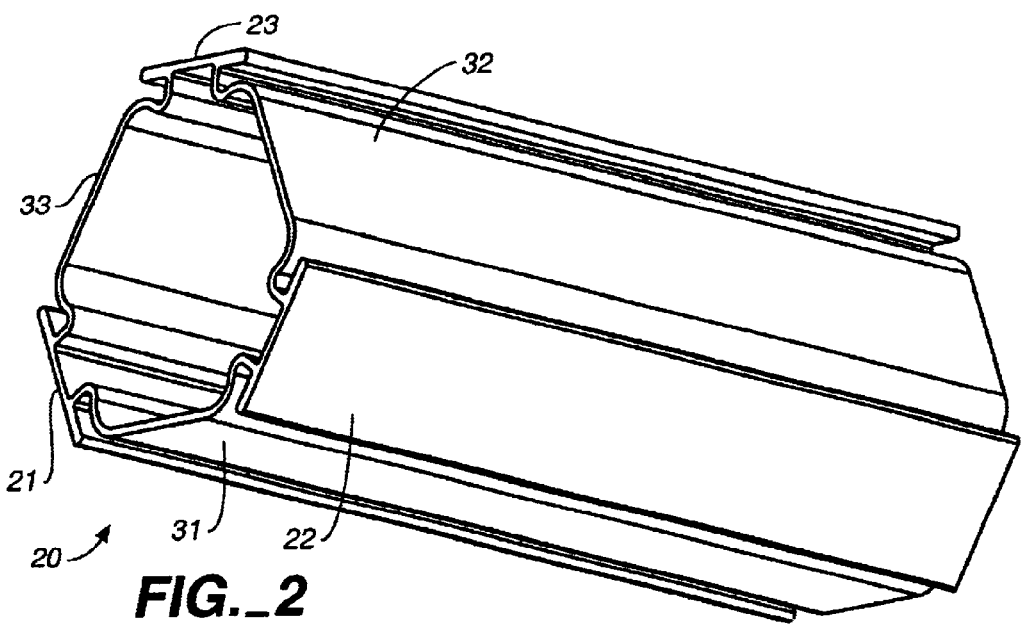
FIG._2
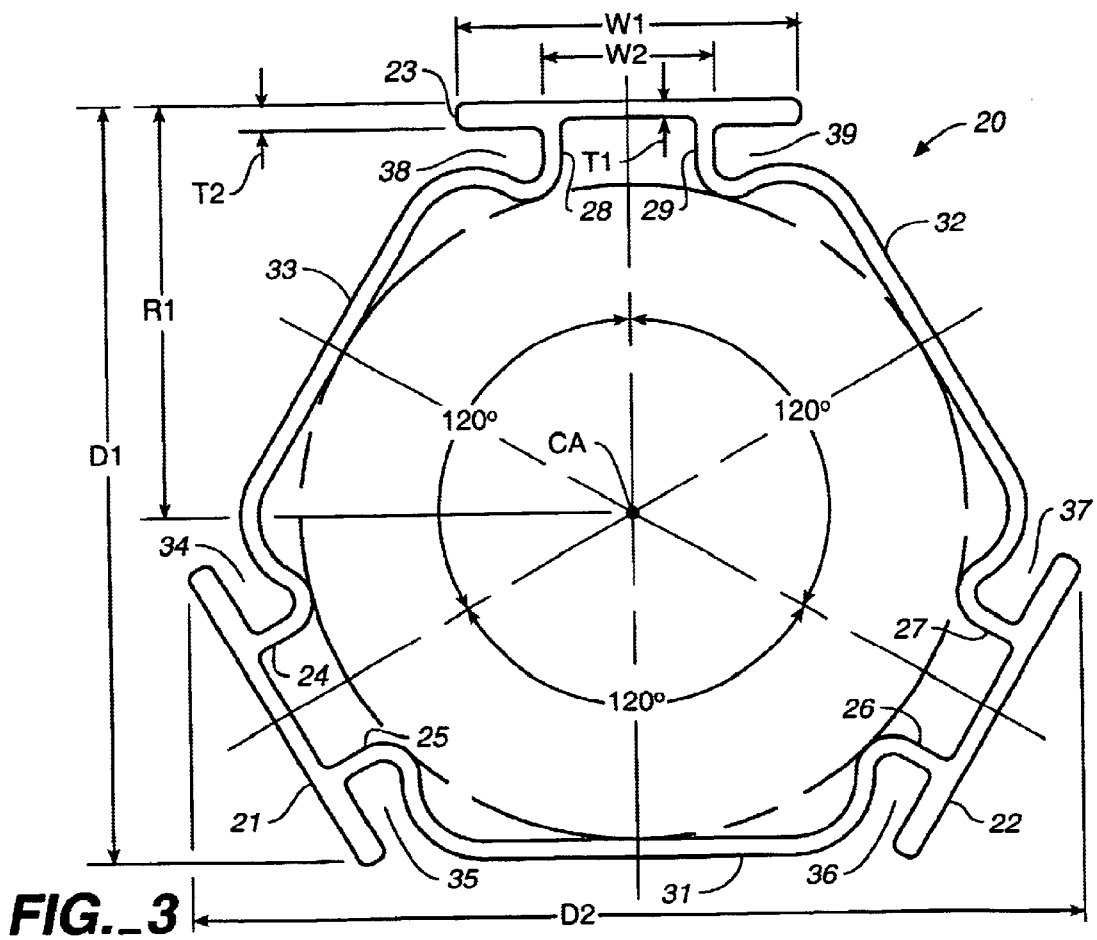
FIG._3

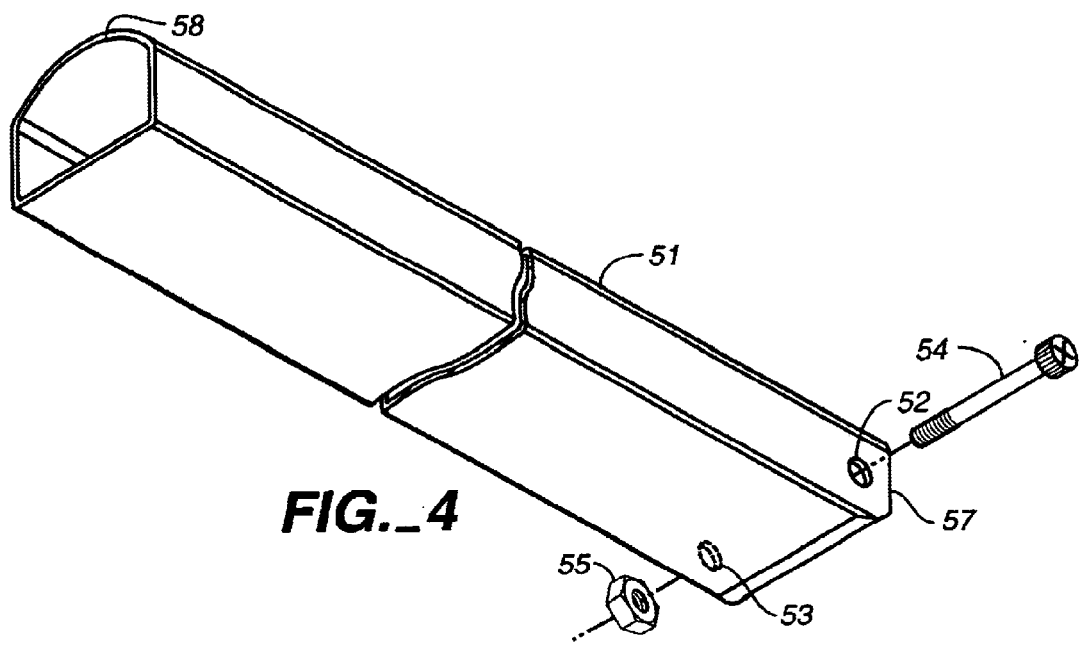
FIG._4
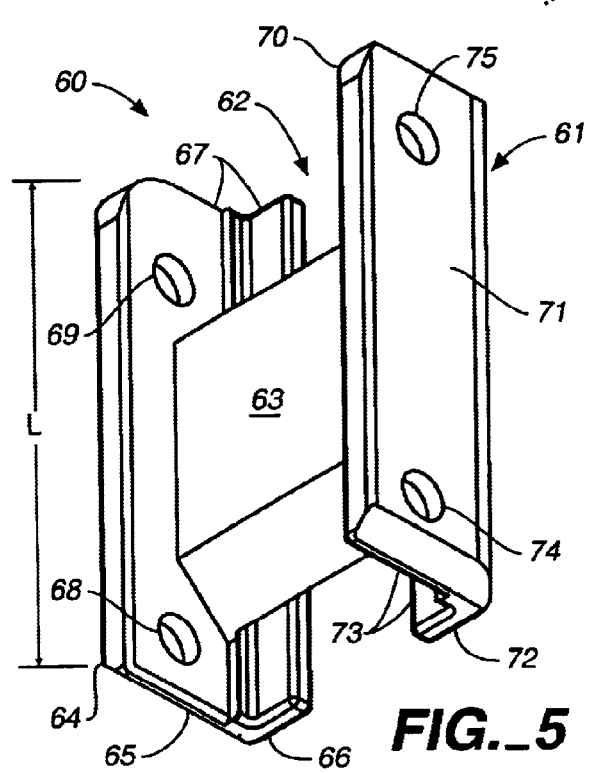
FIG._5
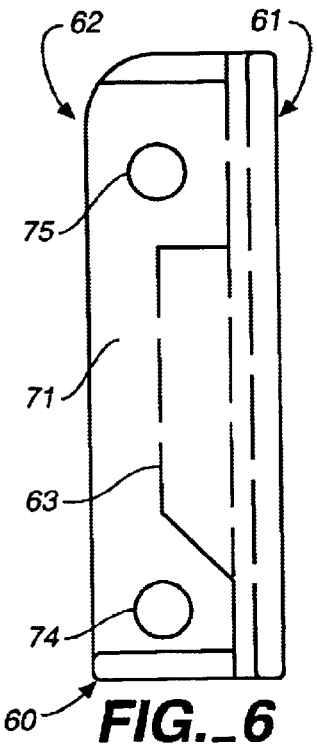
FIG._6
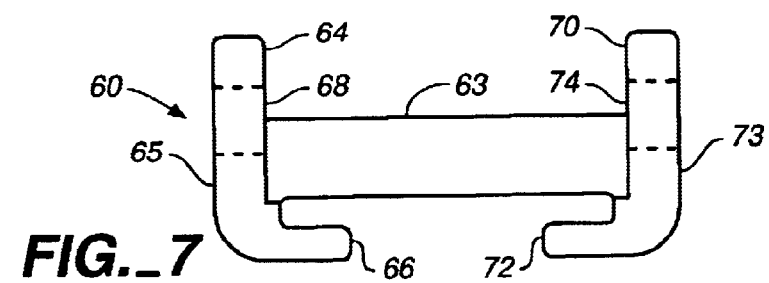
FIG._7

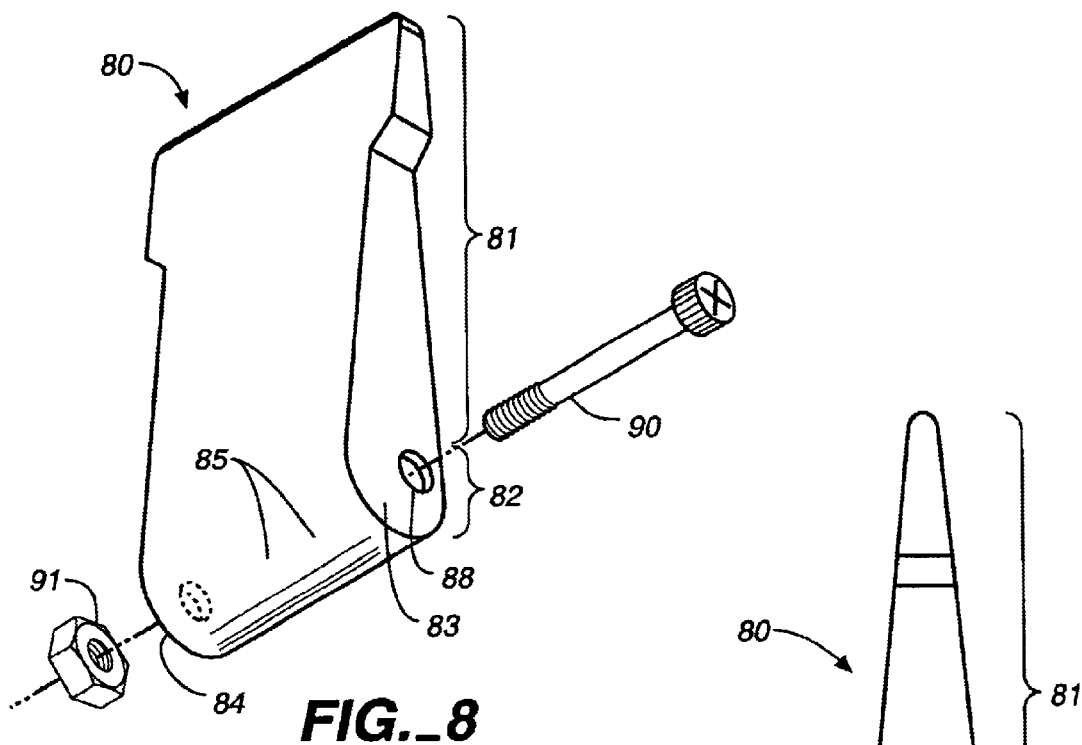
FIG._8
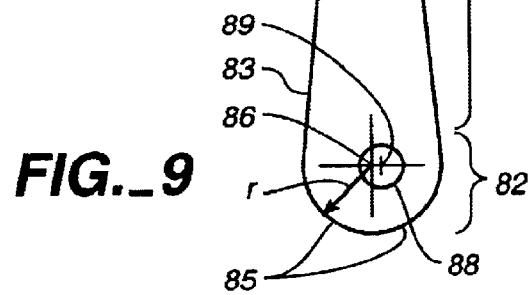
FIG._9
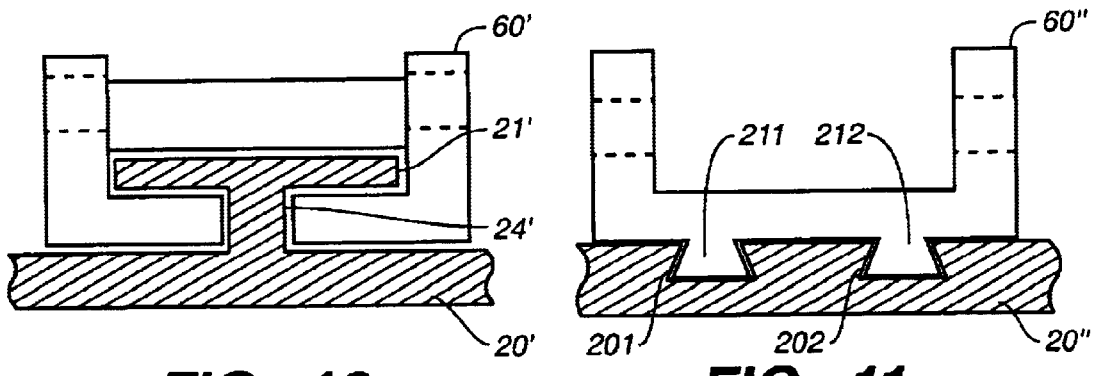
FIG._10  FIG._11

POSITIONING POLES FOR SURVEYING EQUIPMENT, GLOBAL POSITIONING ANTENNAS, AND THE LIKE

FIELD OF THE INVENTION

The present invention relates to monopoles and survey poles for holding and positioning surveying equipment, global positioning antennas, and the like.

BACKGROUND OF THE INVENTION

There is a need in the surveying art and the global positioning (GPS) art to enable easy set-up of monopoles and surveying poles, and compact storage when not in use. There is a further need for these poles to be inexpensive to manufacture and convenient to transport. The present invention is directed to addressing these needs.

SUMMARY OF THE INVENTION

Broadly stated, the present invention encompasses a positioning pole comprising a center pole, a first guide disposed on an outer surface of the center pole, a first support leg, and a first attachment coupler which pivotally attaches the first support leg to the first guide. In preferred embodiments, the center pole has an elongated dimension and an outer surface disposed along the elongated dimension, and the first guide has an elongated dimension oriented parallel to the elongated dimension of the pole. Also in preferred embodiments, the first attachment coupler has an elongated dimension, a first face, and a second face, with the elongated dimension being shorter than the elongated dimension of the first guide. The first face of the first attachment coupler has a contoured surface which interfits with the first guide of the pole and enables the first attachment coupler to slide along the elongated dimension of the first guide without separating from the guide in directions that are perpendicular to the guide's elongated dimension.

Also in preferred embodiments, the positioning pole comprises one or more additional sets of guides, attachment couplers, and support legs. In addition, a locking mechanism is included to lock each attachment coupler to its corresponding guide once a desired position is found for its respective support leg.

To store the positioning pole, each of the support legs can be rotated toward, and positioned against, the center pole (i.e., folded against the center pole), and with each attachment coupler being slide toward the top end of the center pole to a point where the length of its respective support leg is disposed within the length of the center pole. When the positioning pole is to be put into use, the center pole is positioned over the monument or surveying mark and set in a rough plumb position, then each leg is rotated outward and the respective attachment coupler is slide down its respective guide until the bottom end of the support leg encounters a supporting location on the ground. The center pole is then placed into a fine plumb position by axially pivoting it around the monument point, during which time the attachment couplers freely move along their respective guides to accommodate the pivoting rotation while not losing their anchoring spots at the ends of the support legs. Once the fine plumb position is found, the attachment couplers may be locked into position against the center pole. The construction of the present invention enables this very simple and fast method of placing and securing the center pole in a plumb position.

The above-described construction enables each support leg to couple into the center pole at a plurality of points along the center pole, enables each set of attachment coupler and support leg to couple into the center pole at a different and independent location to better match the ground topology, enables each support leg to be placed at a different and independent angle with respect to the center pole to also better match the ground topology, and enables easy locking of the leg positions once the plumb point of the center pole is found. Usually the support legs in prior art tripods are constructed with adjustable lengths, and the positioning of the ends of these legs on the ground is adjusted by adjusting the length of the support legs. While adjustable-length support legs may be used in the present invention, the above-described sliding construction of the present invention provides an additional way of positioning the ends of the support legs, one which is more convenient in many ways to the telescoping mechanism of the prior art tripod poles.

As described in greater detail below, the above-construction of the present invention enables the center pole and support legs to be made by inexpensive extrusion methods, and enables the attachment couplers and locking arms to be made by inexpensive casting methods.

Accordingly, it is an object of the present invention to provide a position pole for surveying equipment, global positioning antennas, and the like which is easy and quick to place and secure into a plumb position.

It is a further object of the present invention to enable the components of positioning poles according to the present invention to be formed by inexpensive manufacturing methods.

It is yet another object of the present invention to provide a position pole which is compact to store and convenient to transport.

These and other objects of the present invention will become apparent to those skilled in the art from the following detailed description of the invention, the accompanying drawings, and the appended claims.

BRIEF DESCRIPTION OF THE DRAWINGS

FIG. 1 shows an exemplary positioning pole according to the present invention.

FIG. 2 shows a isometric view of a section of an exemplary center pole according to the present invention.

FIG. 3 shows an end view of the exemplary center pole shown in FIG. 2 according to the present invention.

FIG. 4 shows a perspective view of an exemplary support leg according to the present invention.

FIG. 5 shows a perspective view of an exemplary attachment coupler according to the present invention.

FIG. 6 show a side view of the exemplary attachment coupler of FIG. 5 according to the present invention.

FIG. 7 shows an end view of the exemplary attachment coupler of FIG. 5 according to the present invention.

FIG. 8 shows a isometric view of a locking arm according to the present invention.

FIG. 9 shows an end view of the exemplary locking arm shown in FIG. 8 according to the present invention.

FIG. 10 shows a cross-sectional view of the interfitting surfaces of another exemplary set of a coupler and guide according to the present invention.

FIG. 11 shows a cross-sectional view of the interfitting surfaces of yet another exemplary set of a coupler and guide according to the present invention.

DETAILED DESCRIPTION OF THE INVENTION

FIG. 1 shows an exemplary positioning pole 10 according to the present invention. Positioning pole 10 comprises a center pole 20, a top mount piece 15 having a threaded shaft for receiving a global positioning system (GPS) antenna 5 or other surveying equipment 5, a bottom marker 18, two or more legs 50 for supporting center pole 20, and two or more attachment couplers 60 for attaching the legs 50 to center pole 20. Center pole 20 has an elongated dimension (e.g., a length), a diameter, an outer surface disposed along the elongated dimension, a first guide 21 disposed on the pole's outer surface having an elongated dimension oriented parallel to the elongated dimension of pole 20, and a second guide 22 disposed on the pole's outer surface having an elongated dimension oriented parallel to the elongated dimension of pole 20. Guides 21 and 22 provide guide tracks upon which attachment couplers 60 can slide, thereby enabling the top ends of legs 50 to be positioned at a plurality of places along the elongated dimension of center pole 20. The position of each coupler 60 along its respective guide may be locked in by a respective locking arm 80, as described below in greater detail. In preferred embodiments of the present invention, center pole 20 has a third guide 23 (shown in FIGS. 2 and 3), and the three guides 21–23 are spaced at equal distances around the diameter of center pole 20 (i.e., they are spaced at 120-degree angles around the center axis CA of pole 20).

FIG. 2 shows a isometric view of a section of center pole 20, and FIG. 3 shows a cross-sectional view thereof. In preferred embodiments, center pole 20 comprises three elongated support bars 31–33 disposed around the pole's center axis CA and spaced apart from one another by equal angles of 120 degrees, as measured around the center axis CA. As best shown in FIG. 3, each support bar 31–33 preferably has a flat middle section, and two curved outer sections which bend inward toward the center axis CA by an angle of approximately 60 degrees. Center pole 20 further comprises three elongated flat bars 21–23 which are disposed around the pole's center axis CA and disposed between support bars 31–33 in an interleaved manner. Flat bars 21–23 are preferably spaced apart from one another by equal angles of 120 degrees, as measured around the center axis CA (i.e., at 120-degree segments of a circle which has its center disposed on the center axis, and which has its circumference and radius perpendicular to center axis CA). A plurality of elongated support ribs 24–29 connect the flat bars 21–23 to the pole's support bars. Specifically, the back surface of flat bar 21, which is the surface facing center axis CA, is coupled to a side edge of support bar 33 by support rib 24, and to a side edge of support bar 31 by support rib 25. In a similar manner, the back surface of flat bar 22 is coupled to another side edge of support bar 31 by support rib 26, and to a side edge of support bar 32 by support rib 27. Also in a similar manner, the back surface of flat bar 23 is coupled to another side edge of support bar 32 by support rib 29, and to another side edge of support bar 33 by support rib 28.

Support ribs 24–29 are disposed inward from respective outer edges of flat bars 21–23 to form a plurality of elongated grooves 34–39 that are disposed between flat bars 21–23 and support bars 31–33. The elongated dimensions of the grooves are parallel to the center axis CA of pole 20. Grooves 34 and 35 are disposed between the back surface of flat bar 21, the outer surfaces of support bars 31 and 33 at their side edges, and the outer surface of support ribs 24 and 25. Flat bar 21 and grooves 34 and 35 provide a first guide (generally referred to by reference number 21) upon which an attachment coupler 60 can slide. In a similar manner, grooves 36 and 37 are disposed between the back surface of flat bar 22, the outer surfaces of support bars 31 and 32 at their side edges, and the outer surface of support ribs 26 and 27. Flat bar 22 and grooves 36 and 37 provide a second guide (generally referred to by reference number 22) upon which an attachment coupler 60 can slide. Finally, grooves 38 and 39 are disposed between the back surface of flat bar 23, the outer surfaces of support bars 32 and 33 at their side edges, and the outer surface of support ribs 28 and 29. Flat bar 23 and grooves 36 and 37 provide a third guide (generally referred to by reference number 23) upon which an attachment coupler 60 can slide.

This particular construction enables one to manufacture center pole 20 with an extrusion process in which all of the bars 21–23 and 31–33 and support ribs 34–39 are formed and attached together simultaneously, and with the grooves 34–39 formed simultaneously therewith, which leads to lower manufacturing costs. As a characteristic of the extrusion process, the outer surface of the center pole is continuous with the outer surface of each guide at the locations where the guides are attached to the center pole.

In preferred embodiments, center pole 20 has a length of between 1.5 meters and 2 meters, and a diameter of around 5 centimeters (legs 50 are about 1 meter in length). Table I provides some exemplary values for the dimensions shown in FIG. 3.

TABLE I

| | |
|---|---|
| R1 | 2.32 centimeters |
| D1 | 4.27 centimeters |
| D2 | 4.94 centimeters |
| W1 | 1.92 centimeters |
| W2 | 9.5 millimeters |
| T1 | 1.0 millimeter |
| T2 | 1.5 millimeters |

FIG. 4 shows a perspective view of an exemplary support leg 50 according to the present invention. Support leg 50 comprises an elongated tubular member 51 having a front curved section, a flat back section opposite to the front section, and two side sections, each side section being disposed between the front and back sections. Support leg 50 further comprises a top end 57 which couples into attachment coupler 60, a bottom end 58 for contacting the ground, and two apertures 52 and 53 formed in respective side sections of tubular member 50 near top end 58. A bolt 54 may be passed through apertures 52 and 53 and corresponding apertures in attachment coupler 60 to secure leg 50 to coupler 60. This is described in further detail below. Cover insert panels (not shown) may be fitted on to ends 57 and 58 to cover them.

FIG. 5 shows a perspective view of an exemplary attachment coupler 60 according to the present invention, and FIGS. 6 and 7 show side and end views thereof, respectively. Coupler 60 has an elongated dimension L, a first face 61, and a second face 62. The elongated dimension L is shorter than the elongated dimension of the guides 21–23 and of center pole 20. First face 61 has a contoured surface which interfits with a guide 21–23 of center pole 20 and enables the attachment coupler 60 to slide along the elongated dimension of the guide without separating from the guide in directions that are perpendicular to the guide's elongated dimension.

In a preferred embodiment, attachment coupler 60 comprises a first elongated angle bar 64 and a second elongated angle bar 70. Angle bar 64 comprises an elongated dimension L, a first leg section 65 having a length disposed parallel to the elongated dimension, a second leg section 66 having a length disposed parallel to the elongated dimension, and a salient angle 67 between its first and second leg sections. (A salient angle is an angle which is less than 180 degrees in value.) Similarly, angle bar 70 comprises an elongated dimension L, a first leg section 71, a second leg section 72, and a salient angle 73 between its first and second leg sections. Salient angles 67 and 73 are preferably less than 135 degrees in value, are more preferably between 70 degrees and 110 degrees in value, and most preferably substantially right angles (e.g., within a few degrees of 90 degrees). Angle bars 64 and 70 are disposed such that their elongated dimensions L are at least approximately parallel to one another, such that their salient angles 67 and 73 face one another, and such that each of the second leg sections 66 and 72 may interfit with a respective groove 34–39 of a guide 21–23. While angle bars 64 and 70 have been shown as being disposed parallel to one another, they may be disposed so that the are approximately parallel to one another (such as within 10 degrees of a parallel orientation).

Attachment coupler 60 further comprises a tie bar 63 which has one end attached to first leg section 65 of angle bar 64 and a second end attached to first leg section 71 of angle bar 70.

A leg 50 is attached at the second face 62 of coupler 60 by bolt 54 passed through a plurality of apertures 68 and 74 of coupler 60 and apertures 52–53 of leg 50. A nut 55 is secured onto the threaded end of bolt 54. Other means of securing may be used. The construction enables leg 50 to be pivotally mounted to coupler 60 at the apertures 68 and 74.

Referring to FIG. 1, positioning pole 10 further comprises a first locking arm 80 which locks the position of attachment coupler 60 to center pole 20 once a desired position for the leg which is coupled to the coupler has been found. Attachment coupler 60 comprises an aperture 69 on angle bar 64 and an opposing aperture 75 on angle bar 70, as shown in FIG. 5, for pivotally attaching locking arm 80. FIG. 8 shows a isometric view of locking arm 80, and FIG. 9 shows an end view thereof. Locking arm 80 has a lever section 81 and cylindrical member section 82. Cylindrical member section 82 has a flat top surface 83, a flat bottom surface 84, a curved side surface 85 which provides a cam surface, a center axis 86 passing perpendicularly through the top and bottom surfaces, a radius r extending from the center axis 86 to a plurality of points on the curved side surface. Center axis 86 is at the intersection of the large crosshairs in FIG. 9. Cylindrical member section 82 may comprise a full cylinder, or may comprise a partial cylinder. In preferred embodiments, Cylindrical member section 82 and lever arm 81 are formed as an integral unit. Cylindrical member section 82 further comprises an aperture 88 passing perpendicularly through the top and bottom surfaces along an axis 89 which is off-center of center axis 86 (i.e., which is in a different location from the location of center axis 86). Cylindrical member section 82 is disposed between top surface 84 and bottom surfaces 85, and is positioned between the angle bars 64 and 70 of coupler 60 with its aperture 88 aligned with apertures 69 and 75 of coupler 60. A bolt 90 (shown in FIG. 8) is passed through apertures 69, 75, and 88 to pivotally attach locking arm 80 to the second surface 62 of coupler 60. A nut 91 is secured onto the threaded end of bolt 90. Other means of securing bolt 90 may be used.

Cylindrical member section 82 is positioned between the angle bars 64 and 70 such that the center axis of aperture 88 is closer to the first surface 61 than the center axis 86 of cylindrical member section 82. When lever section 81 is oriented in the vertical upright position, there is sufficient space between curved side surface 85 and the second leg sections 66 and 72 of coupler 60 to allow a flat bar 21–23 to slide freely between them and along the elongated direction. As the lever section 81 is rotated downward, portions of curved surface 85 are rotated into contact with the flat bar 21 (or 22 or 23) due to aperture 88 being off-center from axis 86. The contact pushes flat bar 21 (or 22 or 23) into contact with the opposing second leg sections 66 and 72 of the angle bars 64 and 70, respectively. Further rotation of lever arm 81 causes the flat bar to be locked against the second leg sections 66 and 72 and held by frictional forces.

To store positioning pole 10, each of the support legs 50 may be rotated toward, and positioned against, center pole 20 (i.e., folded against the center pole), with each attachment coupler 60 being slide toward the top end of center pole 20 to a point where the length of each support leg 50 is disposed within the length of center pole 20. When the positioning pole 10 is to be put into use, bottom marker 18 of center pole 20 is positioned over the monument or surveying mark and set in a rough plumb position, then each leg 50 is rotated outward and the respective attachment coupler 60 is slide down its respective guide 21–23 until the bottom end 58 of the support leg 50 encounters a supporting location on the ground. Center pole 20 is then placed into a fine plumb position by pivoting it around the monument point, during which time the attachment couplers 60 freely move along their respective guides 21–23 to accommodate the pivoting rotation while not losing their anchoring spots at the ends 58 of the support legs 50. To facilitate this action, legs 50 may be initially rotated outward from center pole 20 at an angle which is between 75% and 90% of the maximum angle at which leg 50 can be extended. Once the fine plumb position is found, the attachment couplers 60 may be locked into position by locking arms 80. The construction of the present invention enables this very simple and fast method of placing and securing the center pole 20 and the equipment on top in a plumb position.

The above-described construction enables each support leg 50 to couple into center pole 20 at a plurality of points along the center pole 20, enables each set of attachment coupler 60 and support leg 50 to couple in at a different and independent location to better match the ground topology, enables each support leg 50 to be placed at a different an independent angle with respect to the center pole 20 to also better match the ground topology, and enables easy locking of the leg positions by simple rotation of locking arms 80 once the plumb point of the center pole 80 is found. Usually the support legs in prior art tripods are constructed with adjustable lengths, and the positioning of the ends of these legs on the ground is adjusted by adjusting the length of the support legs. While adjustable-length support legs may be used in the present invention, the above-described sliding construction of the present invention provides an additional way of positioning the ends of the support legs, one which is more convenient in many ways to the telescoping mechanism of the prior art tripod poles.

It may be appreciated that other interfitting surfaces between attachment coupler 60 and guide 21 may be used. FIG. 10 shows another such embodiment where a flat beam 21' is coupled to a center pole 20' by a single support rib 24'. FIG. 11 shows another embodiment where two dovetail grooves 201 and 202 are formed in a center pole 20", and two corresponding interfitting dovetail 211 and 212 protrusions are formed in a attachment coupler 60".

While the present invention has been particularly described with respect to the illustrated embodiments, it will be appreciated that various alterations, modifications and adaptations may be made based on the present disclosure, and are intended to be within the scope of the present invention. While the invention has been described in connection with what is presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. A positioning pole comprising:

a center pole having an elongated dimension, a center axis oriented parallel to the elongated dimension, an outer surface disposed along the elongated dimension and about the center axis, a first guide disposed on the outer surface and having an elongated dimension oriented parallel to the elongated dimension of the pole, and a second guide disposed on the outer surface and having an elongated dimension oriented parallel to the elongated dimension of the pole, the first and second guides being located at different angular positions relative to the center axis;

a first attachment coupler having an elongated dimension, a first face, and a second face, the elongated dimension being shorter than the elongated dimension of the first guide, the first face having a contoured surface which interfits with the first guide of the pole and enables the fist attachment coupler to slide along the elongated dimension of the first guide;

a first support leg having a first end pivotally attached to the second face of the first attachment coupler, and a second end, the first support leg being rotatable between a position where its second end is toward the center pole and a plurality of extended positions where its second end is extended away from the center pole, the first support leg being attached to the center pole only at its first end when the first support leg is in one of its extended positions;

a second attachment coupler having an elongated dimension, a first face, and a second face, the elongated dimension being shorter than the elongated dimension of the second guide, the first face having a contoured surface which interfits with the second guide of the pole and enables the second attachment coupler to slide along the elongated dimension of the second guide, the second attachment coupler being independently moveable with respect to the first attachment coupler; and a second support leg having a first end pivotally attached to the second face of the second attachment coupler, and a second end, the second support leg being rotatable between a position where its second end is toward the center pole and a plurality of extended positions where its second end is extended away from the center pole, the second support leg being attached to the center pole only at its first end when the second support leg is in one of its extended positions; and wherein the first and second support legs are independently moveable when in their extended positions.

2. The positioning pole of claim 1 wherein said first guide comprises a flat bar having a first surface facing the surface of the center pole, a second surface opposite to the first surface and facing outward from the center pole, and an elongated dimension which is parallel to the elongated dimension of the center pole, and wherein said first guide further comprises at least one support rib which connects the second surface of the flat bar to the center pole.

3. The positioning pole of claim 2 wherein said first guide comprises two support ribs, each having a first side attached to the first surface of the flat bar, a second side attached to the pole, and an elongated dimension disposed parallel to the elongated dimension of the flat bar, each support rib being disposed inward from a respective edge of the flat bar to form a respective groove between the flat bar and the pole.

4. The positioning pole of claim 3 wherein the first attachment coupler comprises a first elongated angle bar and a second elongated angle bar, each angle bar comprising an elongated dimension, a first leg section having a length disposed parallel to the elongated dimension, and a second leg section having a length disposed parallel to the elongated dimension, and an salient angle between its first and second leg sections, said first and second angle bars being disposed such that their elongated dimensions are at least approximately parallel to one another, such that their salient angles face one another, and such that each of the second leg sections may interfit with a respective groove of said first guide.

5. The positioning pole of claim 4 wherein said first attachment coupler further comprises a tie bar which has one end attached to first leg section of the first angle bar and a second end attached to the first leg section of the second angle bar.

6. The positioning pole of claim 4 wherein each of said angle bars of said first attachment coupler has an aperture formed in its first leg section, and wherein said first support leg is pivotally attached to said first attachment coupler at said apertures.

7. The positioning pole of claim 4 wherein said first attachment coupler further comprises a first locking arm which has a lever arm and cylindrical member section, said cylindrical member section having a top surface, a bottom surface, a curved side surface which is disposed between the top and bottoms surfaces and which provides a cam surface, a center axis passing through the top and bottom surfaces, a radius extending from the center axis to a plurality of points on the curved side surface, and an aperture passing through the top and bottom surfaces along an axis which is different from the center axis.

8. The positioning pole of claim 1 further comprising a first locking arm pivotally attached to the second face of the attachment coupler and having a cam surface which is rotated into a position in which it presses against a surface portion of the first guide.

9. The positioning pole of claim 1 wherein the first guide has an outer surface, and wherein the center pole is formed by extrusion such that outer surface of the center pole is continuous with the outer surface of the first guide along at least one location where the first guide is attached to the center pole.

10. A positioning pole comprising:

a center pole having an elongated dimension, a center axis oriented parallel to the elongated dimension, an outer surface disposed along the elongated dimension and about the center axis, a first guide disposed on the outer surface and having an elongated dimension oriented parallel to the elongated dimension of the pole, and a second guide disposed on the outer surface and having an elongated dimension oriented parallel to the elongated dimension of the pole, the first and second guides being located at different positions on the outer surface relative to the center axis, the first guide comprising a first dovetail groove formed in the center pole and the second guide comprising a second dovetail groove formed in the center pole;

a first attachment coupler having an elongated dimension, a first face, and a second face, the elongated dimension being shorter than the elongated dimension of the first guide, the first face having a dovetail protrusion which interfits with the first dovetail groove and enables the first attachment coupler to slide along the elongated dimension of the first guide;

a first support leg having a first end pivotally attached to the second face of the first attachment coupler, and a second end;

a second attachment coupler having an elongated dimension, a first face, and a second face, the elongated dimension being shorter than the elongated dimension of the second guide, the first face having a dovetail protrusion which interfits with the second dovetail groove and enables the second attachment coupler to slide along the elongated dimension of the second guide, the second attachment coupler being independently moveable with respect to the first attachment coupler; and a second support leg having a first end pivotally attached to the second face of the second attachment coupler, and a second end.

11. The positioning pole of claim 10 further comprising a first locking arm pivotally attached to the second face of the attachment coupler and having a cam surface which is rotated into a position in which it presses against a surface portion of the first guide.

12. The positioning pole of claim 10 wherein the first guide has an outer surface, and wherein the center pole is formed by extrusion such that outer surface of the center pole is continuous with the outer surface of the first guide along at least one location where the first guide is attached to the center pole.

13. A positioning pole comprising:

a center pole having an elongated dimension, an outer surface disposed along the elongated dimension, a first guide disposed on the outer surface and having an elongated dimension oriented parallel to the elongated dimension of the pole, and a second guide disposed on the outer surface and having an elongated dimension oriented parallel to the elongated dimension of the pole, said first guide comprising a flat bar having a first surface facing the surface of the center pole, a second surface opposite to the first surface and facing outward from the center pole, and an elongated dimension which is parallel to the elongated dimension of the center pole, said first guide further comprising at least one support rib which connects the second surface of the flat bar to the center pole;

a first attachment coupler having an elongated dimension, a first face, and a second face, the elongated dimension being shorter than the elongated dimension of the first guide, the first face having a contoured surface which interfits with the first guide of the pole and enables the first attachment coupler to slide along the elongated dimension of the first guide;

a first support leg having a first end pivotally attached to the second face of the first attachment coupler, and a second end;

a second attachment coupler having an elongated dimension, a first face, and a second face, the elongated dimension being shorter than the elongated dimension of the second guide, the first face having a contoured surface which interfits with the second guide of the pole and enables the second attachment coupler to slide along the elongated dimension of the second guide; and a second support leg having a first end pivotally attached to the second face of the second attachment coupler, and a second end.

14. The positioning pole of claim 13 wherein said first guide comprises two support ribs, each having a first side attached to the first surface of the flat bar, a second side attached to the pole, and an elongated dimension disposed parallel to the elongated dimension of the flat bar, each support rib being disposed inward from a respective edge of the flat bar to form a respective groove between the flat bar and the pole.

15. The positioning pole of claim 14 wherein the first attachment coupler comprises a first elongated angle bar and a second elongated angle bar, each angle bar comprising an elongated dimension, a first leg section having a length disposed parallel to the elongated dimension, and a second leg section having a length disposed parallel to the elongated dimension, and an salient angle between its first and second leg sections, said first and second angle bars being disposed such that their elongated dimensions are at least approximately parallel to one another, such that their salient angles face one another, and such that each of the second leg sections may interfit with a respective groove of said first guide.

16. The positioning pole of claim 15 wherein said first attachment coupler further comprises a tie bar which has one end attached to first leg section of the first angle bar and a second end attached to the first leg section of the second angle bar.

17. The positioning pole of claim 15 wherein each of said angle bars of said first attachment coupler has an aperture formed in its first leg section, and wherein said first support leg is pivotally attached to said first attachment coupler at said apertures.

18. The positioning pole of claim 15 wherein said first attachment coupler further comprises a first locking arm which has a lever arm and cylindrical member section, said cylindrical member section having a top surface, a bottom surface, a curved side surface which is disposed between the top and bottoms surfaces and which provides a cam surface, a center axis passing through the top and bottom surfaces, a radius extending from the center axis to a plurality of points on the curved side surface, and an aperture passing through the top and bottom surfaces along an axis which is different from the center axis.

19. The positioning pole of claim 13 further comprising a first locking arm pivotally attached to the second face of the attachment coupler and having a cam surface which is rotated into a position in which it presses against a surface portion of the first guide.

20. The positioning pole of claim 13 wherein the first guide has an outer surface, and wherein the center pole is formed by extrusion such that outer surface of the center pole is continuous with the outer surface of the first guide along at least one location where the first guide is attached to the center pole.

21. A positioning pole comprising:

a center pole having an elongated dimension, an outer surface disposed along the elongated dimension, a first guide disposed on the outer surface and having an elongated dimension oriented parallel to the elongated dimension of the pole, and a second guide disposed on the outer surface and having an elongated dimension oriented parallel to the elongated dimension of the pole;

a first attachment coupler having an elongated dimension, a first face, and a second face, the elongated dimension being shorter than the elongated dimension of the first guide, the first face having a contoured surface which interfits with the first guide of the pole and enables the first attachment coupler to slide along the elongated dimension of the first guide;

a first support leg having a first end pivotally attached to the second face of the first attachment coupler, and a second end;

a second attachment coupler having an elongated dimension, a first face, and a second face, the elongated dimension being shorter than the elongated dimension of the second guide, the first face having a contoured surface which interfits with the second guide of the pole and enables the second attachment coupler to slide along the elongated dimension of the second guide;

a second support leg having a first end pivotally attached to the second face of the second attachment coupler, and a second end; and a first locking arm pivotally attached to the second face of the first attachment coupler and having a cam surface which is rotated into a position in which it presses against a surface portion of the first guide.

22. The positioning pole of claim 21 wherein the first guide has an outer surface, and wherein the center pole is formed by extrusion such that outer surface of the center pole is continuous with the outer surface of the first guide along at least one location where the first guide is attached to the center pole.

23. The positioning pole of claim 21 wherein the first guide comprises a first dovetail groove formed in the center pole, and the second guide comprises a second dovetail groove formed in the center pole.

24. A positioning pole comprising:
   a center pole having an elongated dimension, a center axis oriented parallel to the elongated dimension, an outer surface disposed along the elongated dimension and about the center axis, a first guide disposed on the outer surface and having an elongated dimension oriented parallel to the elongated dimension of the pole, and a second guide disposed on the outer surface and having an elongated dimension oriented parallel to the elongated dimension of the pole, the first and second guides being located at different angular positions relative to the center axis;
   a first attachment coupler having an elongated dimension which is shorter than the elongated dimension of the first guide, and a contoured surface which interfits with the first guide of the pole and enables the first attachment coupler to slide along the elongated dimension of the first guide;
   a first support leg having a first end pivotally attached to the first attachment coupler, and a second end, the first support leg being rotatable between a position where its second end is toward the center pole and a plurality of extended positions where its second end is extended away from the center pole, the first support leg being attached to the center pole only at its first end when the first support leg is in one of its extended positions;
   a second attachment coupler having an elongated dimension which is shorter than the elongated dimension of the second guide, and a contoured surface which interfits with the second guide of the pole and enables the second attachment coupler to slide along the elongated dimension of the second guide, the second attachment coupler being independently moveable with respect to the first attachment coupler; and
   a second support leg having a first end pivotally attached to the second attachment coupler, and a second end, the second support leg being rotatable between a position where its second end is toward the center pole and a plurality of extended positions where its second end is extended away from the center pole, the second support leg being attached to the center pole only at its first end when the second support leg is in one of its extended positions; and
   wherein the first and second support legs are independently moveable when in their extended positions.

25. The positioning pole of claim 24 wherein said first guide comprising a flat bar having a first surface facing the surface of the center pole, a second surface opposite to the first surface and facing outward from the center pole, and an elongated dimension which is parallel to the elongated dimension of the center pole, said first guide further comprising at least one support rib which connects the second surface of the flat bar to the center pole.

26. The positioning pole of claim 24 wherein said first guide comprises a first dovetail groove formed in the center pole, and said second guide comprises a second dovetail groove formed in the center pole.

27. The positioning pole of claim 24 further comprising a first locking arm pivotally attached to the second face of the attachment coupler and having a cam surface which is rotated into a position in which it presses against a surface portion of the first guide.

* * * * *

UNITED STATES PATENT AND TRADEMARK OFFICE
CERTIFICATE OF CORRECTION

PATENT NO.    : 6,659,409 B2
DATED         : December 9, 2003
INVENTOR(S)   : Javad Ashjaee It is certified that error appears in the above-identified patent and that said Letters Patent is hereby corrected as shown below:

<u>Title page</u>,
Item [73], Assignee, delete "Topson" and insert therefor -- Topcon --.

<u>Column 7</u>,
Line 16, delete "eloneated" and insert therefor -- elongated --.
Line 31, delet "fist" and insert therefor -- first --.

<u>Column 8</u>,
Line 17, delete "an" and insert therefor -- a --.
Line 26, after "to" insert -- the --.
Line 36, after "and" insert -- a --.
Line 39, delete "bottoms" and insert therefor -- bottom --.

<u>Column 9</u>,
Line 34, after "that" insert -- the --.

<u>Column 10</u>,
Line 22, after the first instance of "and" insert -- a --.
Line 31, after "to" insert -- the --.
Line 41, after "and" insert -- a --.
Line 44, delete "bottoms" and insert therefor -- bottom --.

<u>Column 12</u>,
Line 32, delete "comprising" and insert therefor -- comprises --.

Signed and Sealed this

Twelfth Day of October, 2004

JON W. DUDAS
*Director of the United States Patent and Trademark Office*